(12) United States Patent
Ito et al.

(10) Patent No.: US 10,114,186 B2
(45) Date of Patent: Oct. 30, 2018

(54) OPTICAL FIBER CABLE, AND METHOD AND APPARATUS FOR MANUFACTURING OPTICAL FIBER CABLE

(71) Applicant: Fujikura Ltd., Koto-ku, Tokyo (JP)

(72) Inventors: Naoto Ito, Sakura (JP); Ken Osato, Sakura (JP); Masayoshi Yamanaka, Sakura (JP); Naoki Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/511,369

(22) PCT Filed: Aug. 12, 2016

(86) PCT No.: PCT/JP2016/073723
§ 371 (c)(1),
(2) Date: Mar. 15, 2017

(87) PCT Pub. No.: WO2017/047305
PCT Pub. Date: Mar. 23, 2017

(65) Prior Publication Data
US 2017/0293097 A1    Oct. 12, 2017

(30) Foreign Application Priority Data
Sep. 18, 2015 (JP) .................................. 2015-185293

(51) Int. Cl.
*G02B 6/44* (2006.01)

(52) U.S. Cl.
CPC ........... *G02B 6/4432* (2013.01); *G02B 6/449* (2013.01)

(58) Field of Classification Search
CPC ..... G02B 6/449; G02B 6/4432; G02B 6/4413
See application file for complete search history.

(56) References Cited

U.S. PATENT DOCUMENTS

| 2,604,509 A | 7/1952 | Blanchard |
| 4,496,214 A * | 1/1985 | Oestreich ............. G02B 6/4413 |
| | | 385/103 |

(Continued)

FOREIGN PATENT DOCUMENTS

| JP | 43-007314 B2 | 3/1968 |
| JP | 52-003654 Y1 | 1/1977 |

(Continued)

OTHER PUBLICATIONS

Extended European Search Report dated Apr. 11, 2018 as issued in corresponding European Application No. 16840323.6.

(Continued)

*Primary Examiner* — Thomas A Hollweg
*Assistant Examiner* — Mary A El Shammaa
(74) *Attorney, Agent, or Firm* — Foley & Lardner LLP

(57) ABSTRACT

An optical fiber cable includes a core including a plurality of units which are assembled and each of which comprises a plurality of optical fibers which are assembled, a pair of tension members disposed so as to face each other with the core interposed therebetween, and a sheath covering the core and the pair of tension members collectively. The units are twisted so as to form a plurality of layers. The plurality of layers includes a first layer having first-layer units formed in an SZ-twisted shape and a second layer having second-layer units formed in an SZ-twisted shape. A twisting direction of the first-layer units is opposite to a twisting direction of the second-layer units in at least a portion in a cable length direction.

7 Claims, 7 Drawing Sheets

(56) References Cited

U.S. PATENT DOCUMENTS

| | | | | |
|---|---|---|---|---|
| 4,828,352 A | | 5/1989 | Kraft | |
| 5,531,064 A | * | 7/1996 | Sawano | G02B 6/4403 385/112 |
| 5,626,010 A | * | 5/1997 | Loczenski | D07B 3/005 57/293 |
| 6,278,828 B1 | * | 8/2001 | Stocklein | G02B 6/105 385/11 |
| 6,404,962 B1 | * | 6/2002 | Hardwick, III | G02B 6/4413 385/112 |
| 6,553,167 B2 | * | 4/2003 | Hurley | G02B 6/4432 385/102 |
| 6,584,251 B1 | * | 6/2003 | Ardouin | G02B 6/449 385/100 |
| 8,805,144 B1 | * | 8/2014 | McAlpine | G02B 6/4433 385/113 |
| 2001/0055452 A1 | * | 12/2001 | Kawabata | G02B 6/4432 385/100 |
| 2003/0206704 A1 | * | 11/2003 | Lee | G02B 6/4413 385/103 |
| 2004/0081412 A1 | * | 4/2004 | Cocchini | C03B 37/01486 385/104 |
| 2006/0072886 A1 | * | 4/2006 | Kim | G02B 6/441 385/115 |
| 2009/0305338 A1 | * | 12/2009 | Ritala-Nurmi | A01H 4/00 435/53 |
| 2012/0175034 A1 | * | 7/2012 | Gauthier | D07B 1/0633 152/527 |
| 2015/0086168 A1 | * | 3/2015 | Blazer | G02B 6/4413 385/102 |
| 2015/0153531 A1 | * | 6/2015 | McAlpine | G02B 6/4413 385/102 |

FOREIGN PATENT DOCUMENTS

| | | |
|---|---|---|
| JP | 60-033714 U1 | 3/1985 |
| JP | 2013-186286 A | 9/2013 |
| JP | 5568071 B2 | 8/2014 |

OTHER PUBLICATIONS

Partial Machine Translation of JP-S52-003654-Y, published Jan. 26, 1977.

Australian Patent Office Action, Application No. 2016321486, dated Nov. 7, 2017.

Canadian Office Action dated Jan. 9, 2018 as issued in corresponding Canadian Application No. 2,960,325.

* cited by examiner

OPTICAL FIBER CABLE, AND METHOD AND APPARATUS FOR MANUFACTURING OPTICAL FIBER CABLE

TECHNICAL FIELD

The present invention relates to an optical fiber cable, and a method and an apparatus for manufacturing the optical fiber cable.

CROSS-REFERENCE TO RELATED APPLICATIONS

The present invention is a National Stage application of PCT/JP2016/073723, filed Aug. 12, 2016, which claims priority to Japanese Patent Application No. 2015-185293, filed on Sep. 18, 2015, the contents of which are incorporated herein by reference.

BACKGROUND ART

In recent years, with increase in demand of communication, a small-diameter optical fiber cable in which optical fibers are mounted in a high density has been required. Examples of such an optical fiber cable include an optical fiber cable having a structure using no slot, such as an optical fiber cable having a core obtained by assembling optical fiber core wires (or units each of which is a bundle of optical fiber core wires) (for example, refer to Patent Document 1).

In an optical fiber cable, a strain characteristic of an optical fiber at a position far away from a bending neutral line is important when bending is applied thereto. Therefore, in order to reduce the strain amount, an optical fiber core wire (or a unit) is generally twisted in one direction or an SZ direction. Particularly, an optical fiber core wire is easily branched, and therefore an SZ-twisted optical fiber cable is requested frequently.

Examples of a structure for holding a twisted state of an optical fiber core wire (or a unit) in an SZ-twisted optical fiber cable include (i) winding of a fibrous interposition and (ii) restriction by a cable sheath.

When winding of an interposition is employed, cost is high due to use of the interposition. In addition, it is necessary to cut the interposition for taking out the optical fiber core wire, and therefore work time is increased. Furthermore, the optical fiber core wire may be cut by accident.

Examples of the optical fiber cable employing the structure for holding a twisted state of a unit by a sheath include an optical fiber cable 110 shown in FIGS. 8(A), 8(B), 9(A), and 9(B).

As shown in FIG. 8(A), the optical fiber cable 110 includes a core 13, a pair of tension members 4, a pair of rip cords 5, and a sheath 6.

The core 13 is constituted by assembling a plurality of units 32 each including a plurality of optical fibers 1. The units 32 are disposed by twisting the units 32 doubly so as to form two layers (inner layer 21 and outer layer 22).

As shown in FIGS. 9(A) and 9(B), each of the units 32 constituting the inner layer 21 and the outer layer 22 has an SZ-twisted shape.

As shown in FIG. 8(A), the pair of tension members 4 is disposed so as to face each other with the core 13 interposed therebetween.

The sheath 6 covers the core 13, the rip cords 5, and the tension members 4 collectively. The sheath 6 holds a twisted state of the units 32.

As shown in FIG. 8(A), a force to remove twisting (force in an untwisting direction indicated by a void arrow) occurs in each of the units 32 by rigidity (or tension).

The sheath 6 is softened immediately after being formed, and therefore is easily deformed by the force in an untwisting direction. Therefore, the force in an untwisting direction (void arrow) may become larger than a holding force by the sheath 6 (black arrow), and a cross-sectional shape of the optical fiber cable 110 may be deformed to become noncircular as shown in FIG. 8(B).

When the cross-sectional shape of the optical fiber cable 110 becomes noncircular, disadvantages may occur in sealing of water by a closure or the like, wiring into a conduit, and the like.

PRIOR ART DOCUMENTS

Patent Documents

[Patent Document 1] Japanese Patent No. 5568071

DISCLOSURE OF INVENTION

Problems to be Solved by the Invention

The present invention has been achieved in view of the above problems, and provides an optical fiber cable including an SZ-twisted optical fiber and capable of preventing deformation of a cross-sectional shape thereof, and a method and an apparatus for manufacturing the optical fiber cable.

Means for Solving the Problems

A first aspect of the present invention is an optical fiber cable including a core including a plurality of units which are assembled and each of which includes a plurality of optical fibers which are assembled, a pair of tension members disposed so as to face each other with the core interposed therebetween, and a sheath covering the core and the pair of tension members collectively. The units are twisted so as to form a plurality of layers. The plurality of layers includes a first layer including first-layer units formed in an SZ-twisted shape and a second layer including second-layer units formed in an SZ-twisted shape. A twisting direction of the first-layer units is opposite to a twisting direction of the second-layer units in at least a portion in a cable length direction.

A second aspect of the present invention is the optical fiber cable according to the first aspect, in which a twisting angle of the first-layer units and a twisting angle of the second-layer units preferably satisfy the following Expression (1):

$$\text{Twisting angle of second-layer units} - \text{Twisting angle of first-layer units} \leq 120° \quad (1).$$

A third aspect of the present invention is the optical fiber cable according to the second aspect, in which the twisting angle of the first-layer units is preferably larger than the twisting angle of the second-layer units.

A fourth aspect of the present invention is the optical fiber cable according to any one of the first to third aspects, in which each of the twisting angles of the first-layer units and the second-layer units is preferably 180° or more.

A fifth aspect of the present invention is a method of manufacturing the optical fiber cable according to any one of the first to fourth aspects using a fiber distributing board having a plurality of fiber distributing portions. The plurality of fiber distributing portions include a first fiber distributing portion having a first unit insertion portion into which the first-layer units are inserted and a second fiber distributing portion having a second unit insertion portion into which the second-layer units are inserted. The first-layer units are inserted into the first unit insertion portion, and the second-layer units are inserted into the second unit insertion portion. While the first-layer units and the second-layer units are received, the first fiber distributing portion and the second fiber distributing portion are rotated independently in a cable shaft rotation direction to twist the first-layer units and the second-layer units. During the rotation, the first fiber distributing portion and the second fiber distributing portion are rotated such that a twisting direction of the first-layer units is opposite to a twisting direction of the second-layer units to form the core, and the sheath is formed so as to cover the core and the pair of tension members collectively.

A sixth aspect of the present invention is an apparatus for manufacturing the optical fiber cable according to any one of the first to fourth aspects, including a fiber distributing board having a plurality of fiber distributing portions, an assembling mechanism which twists and assembles the first-layer units and the second-layer units, and a sheath forming apparatus which forms the sheath. The plurality of fiber distributing portions includes a first fiber distributing portion having a first unit insertion portion into which the first-layer units are inserted and a second fiber distributing portion having a second unit insertion portion into which the second-layer units are inserted. The first fiber distributing portion and the second fiber distributing portion can be rotated independently in a cable shaft rotation direction.

Effects of the Invention

According the aspects of the present invention, the twisting direction of the first-layer units is opposite to the twisting direction of the second-layer units. Therefore, a direction of a force of the first-layer units to remove twisting is opposite to a direction of a force of the second-layer units to remove twisting. Therefore, these forces are cancelled by each other in at least a portion, and a force in an untwisting direction is reduced as a whole.

Therefore, it is possible to prevent an optical fiber cable from being deformed into a noncircular shape due to the force in an untwisting direction.

EMBODIMENTS FOR CARRYING OUT THE INVENTION

Figure 1:
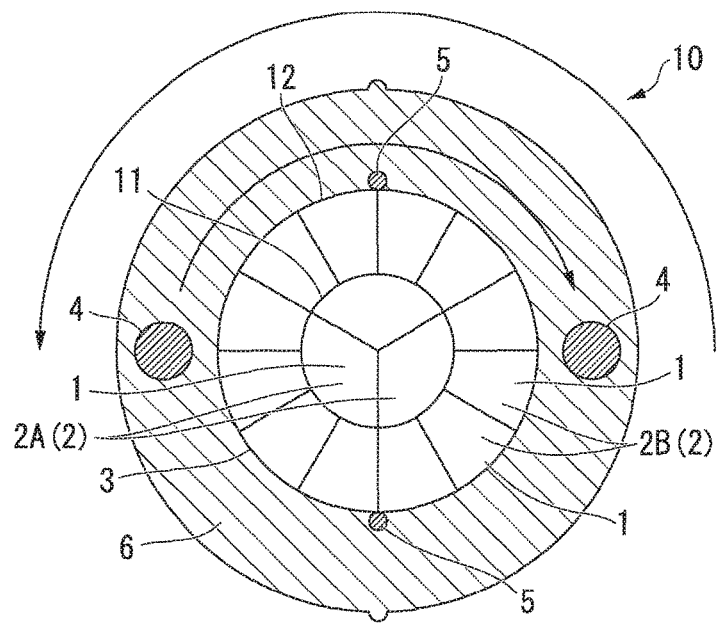
FIG. 1 is a cross-sectional view showing an example of an optical fiber cable according to an embodiment of the present invention.
Figure 2:
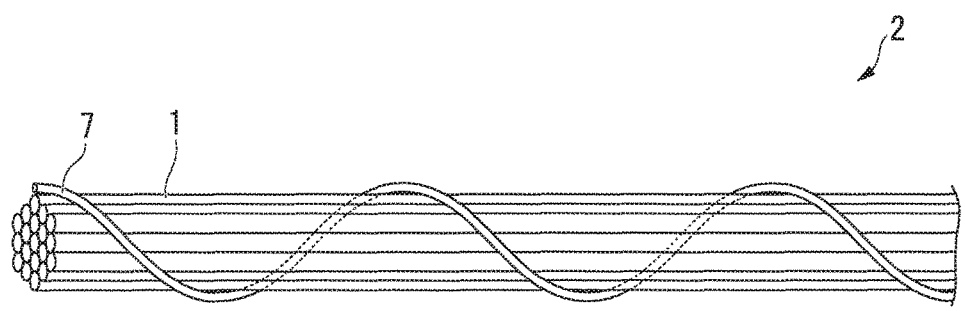
FIG. 2 is a perspective view showing an example of a unit used for the optical fiber cable shown in FIG. 1.

Hereinafter, the present invention will be described based on a preferable embodiment with reference to the drawings.
Optical Fiber Cable FIG. 1 is a cross-sectional view showing an optical fiber cable 10 according to the embodiment of the present invention. FIG. 1 is a cross-sectional view of the optical fiber cable 10, vertical to a longitudinal direction thereof. FIG. 2 is a perspective view showing an example of a unit 2 used for the optical fiber cable 10. FIG. 3(A) is a side view showing an outer layer unit 2B. FIG. 3(B) is a side view showing an inner layer unit 2A.

Note that a length direction of the optical fiber cable 10 is referred to as a "cable length direction". In FIG. 1, the cable length direction is a direction vertical to a paper surface, and is a left-right direction in FIG. 3.

As shown in FIG. 1, the optical fiber cable 10 includes a core 3, a pair of tension members 4, a pair of rip cords 5, and a sheath 6.

The core 3 is constituted by assembling a plurality of units 2 each of which is obtained by assembling a plurality of optical fibers 1. As shown in FIG. 2, for example, the plurality of optical fibers 1 constituting each of the units 2 is bundled, and a binding material 7 (identification thread) can be wound therearound.

The cross-sectional shape of the core 3 is preferably circular. Note that the cross-sectional shape of the core 3 does not need to be completely circular, and may be, for example, elliptic.

Each of the optical fibers 1 is preferably an optical fiber core wire, and may be an optical fiber strand, an optical fiber tape core wire, or the like.

As shown in FIGS. 1, 3(A), and 3(B), the units 2 are disposed by twisting the units 2 doubly so as to form two layers (inner layer 11 and outer layer 12).

Each of the units 2 constituting the inner layer 11 is referred to as an inner layer unit 2A (first layer), and each of the units 2 constituting the outer layer 12 is referred to as an outer layer unit 2B (second layer). The inner layer 11 is adjacent to the outer layer 12 in a layer stacking direction (diameter direction of the core 3). The inner layer 1 and the outer layer 12 may be in contact with each other, or may be separated from each other partially by a protective tape or the like.

As shown in FIGS. 3(A) and 3(B), the units 2 (2A and 2B) constituting the inner layer 11 and the outer layer 12 are formed in an SZ-twisted shape, that is, so as to repeat S twist and Z twist alternately.

A portion at which the twist of the units 2 is changed from S twist to Z twist (or from Z twist to S twist) is referred to as a reversing portion R. A distance between the reversing portions R and R adjacent to each other in the cable length direction is referred to as a twisting pitch p.

As shown in FIG. 3(A), the reversing portion R of the units 2 in the outer layer 12 is referred to as a reversing portion R2, and the twisting pitch p of the units 2 in the outer layer 12 is referred to as a twisting pitch p2.

As shown in FIG. 3(B), the reversing portion R of the units 2 in the inner layer 11 is referred to as a reversing portion R1, and the twisting pitch p of the units 2 in the inner layer 11 is referred to as a twisting pitch p1.

The twisting pitch p2 of the units 2 in the outer layer 12 is preferably equal to the twisting pitch p1 of the units 2 in the inner layer 11.

When the twisting pitches p1 and p2 are equal to each other, a twisting direction of the units 2 in the inner layer 11 can be opposite to that in the outer layer 12 in a wide range in the cable length direction. Therefore, forces of the units 2 in the inner layer 11 and the outer layer 12 in an untwisting direction are easily cancelled by each other.

The force in an untwisting direction is a force generated by rigidity of the units 2 (or tension applied to the units 2), and is a force to remove twisting (for example, a force in a clockwise arrow direction in FIG. 1). The force in an untwisting direction has a direction opposite to the twisting direction of the units 2 indicated by a counterclockwise arrow.

As shown in FIGS. 3(A) and 3(B), the reversing portion R2 in the outer layer 12 is preferably at the same position as the reversing portion R1 in the inner layer 11 in the cable length direction.

When the reversing portions R1 and R2 are at the same position as each other in the cable length direction, the twisting direction of the units 2 in the inner layer 1 can be opposite to that in the outer layer 12 in a wide range in the cable length direction. Therefore, forces of the units 2 in the inner layer 11 and the outer layer 12 in an untwisting direction are easily cancelled by each other.

In the optical fiber cable 10, the twisting direction of the units 2 in the inner layer 11 is opposite to that in the outer layer 12. Hereinafter, a specific description will be provided.

As shown in FIG. 3(A), a section between a first reversing portion R21 and a second reversing portion R22 adjacent to the first reversing portion R21 in the reversing portion R2 in the outer layer 12 is referred to as a first section S21. A section between the second reversing R22 and a third reversing portion R23 adjacent to the second reversing R22 is referred to as a second section S22.

Figure 3:
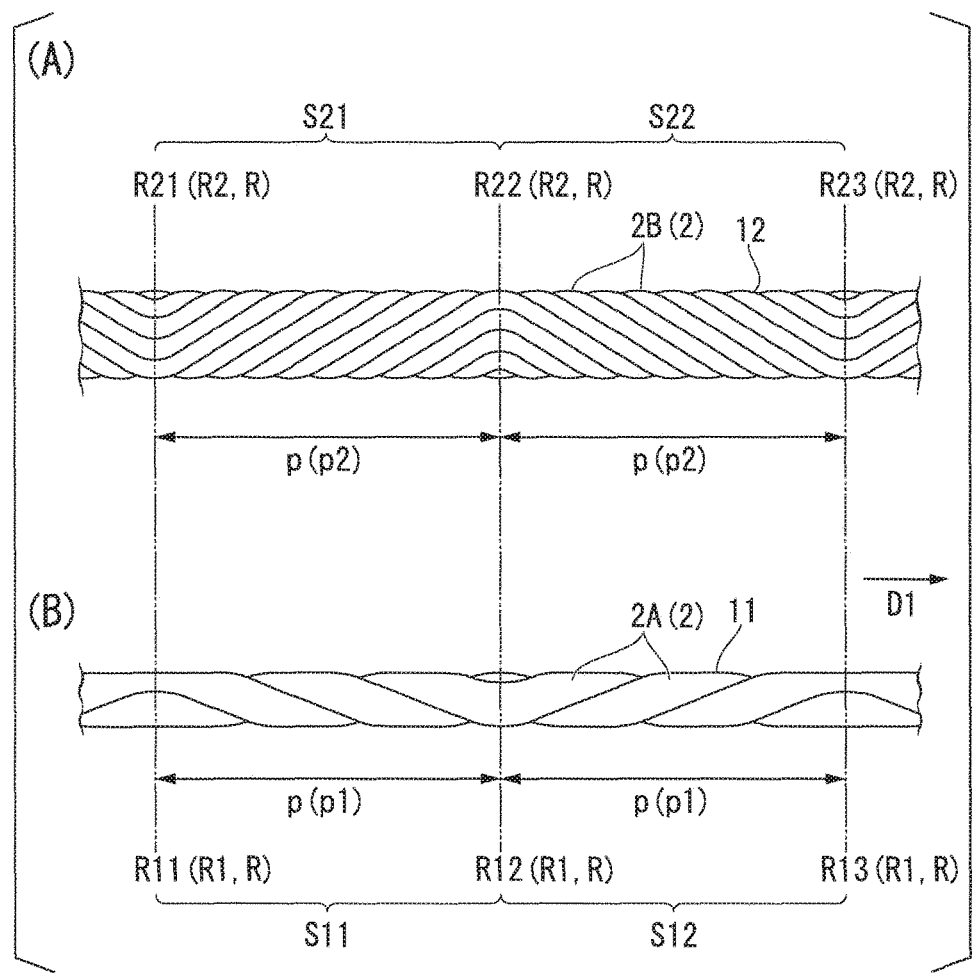
FIG. 3(A) is a side view showing an outer layer unit of the optical fiber cable shown in FIG. 1.
FIG. 3(B) is a side view showing an inner layer unit of the optical fiber cable shown in FIG. 3(A).

In the first section S21, the twisting direction of the units 2 is counterclockwise toward a first direction D1 (right direction in FIG. 3). In the second section S22, the twisting direction of the units 2 is clockwise toward the first direction D1.

Note that the first direction D1 is one direction in the cable length direction.

As shown in FIG. 3(B), a section between a first reversing portion R11 and a second reversing portion R12 adjacent thereto in the reversing portion R1 in the inner layer 11 is referred to as a first section S11. A section between the second reversing R12 and a third reversing portion R13 adjacent thereto is referred to as a second section S12.

In the first section S11, the twisting direction of the units 2 is clockwise toward the first direction D1. In the second section S12, the twisting direction of the units 2 is counterclockwise toward the first direction D1.

In the optical fiber cable 10, the reversing portion R2 in the outer layer 12 and the reversing portion R1 in the inner layer 11 are at the same position as each other in the cable length direction. Therefore, the first section S21 in the outer layer 12 and the first section S11 in the inner layer 11 are at the same position as each other in the cable length direction.

Similarly, the second section S22 in the outer layer 12 and the second section S12 in the inner layer 11 are at the same position as each other in the cable length direction.

In the first sections S11 and S21, the twisting direction of the units 2 in the outer layer 12 is counterclockwise, and the twisting direction of the units 2 in the inner layer 11 is clockwise. In the second sections S12 and S22, the twisting direction of the units 2 in the outer layer 12 is clockwise, and the twisting direction of the units 2 in the inner layer 11 is counterclockwise.

In this way, the twisting direction of the units 2 in the inner layer 11 is opposite to that in the outer layer 12 in any section.

For example, each of the twisting angles of the units 2 in the inner layer 11 and the outer layer 12 can be 180° or more.

The twisting angle is an angle from one reversing portion R1 or R2 (for example, the first reversing portion R11 or R21) to a reversing portion R1 or R2 adjacent thereto (for example, the second reversing portion R12 or R22) in a shaft rotation direction of the optical fiber cable 10.

When each of the twisting angles of the units 2 in the inner layer 11 and the outer layer 12 is too small, by application of bending to the optical fiber cable 10, bending strain is not relieved, and increase in transmission loss, reduction in a rupture lifetime of the optical fibers 1, and the like may occur. However, by setting the twisting angle of the units 2 in the above range, an increase in transmission loss, a reduction in a rupture lifetime of the optical fibers, and the like can be achieved.

Each of the twisting angles of the units 2 in the inner layer 11 and the outer layer 12 is preferably 360° or less.

The twisting angle of the units 2 in the inner layer 11 (inner-layer twisting angle) and the twisting angle of the units 2 in the outer layer 12 (outer-layer twisting angle) preferably satisfy the following Expression (1).

$$\text{Outer-layer twisting angle} - \text{Inner-layer twisting angle} \leq 120° \quad (1)$$

When the outer-layer twisting angle and the inner-layer twisting angle satisfy Expression (1), the cross-sectional shape of the optical fiber cable 10 hardly becomes noncircular.

The inner-layer twisting angle is preferably larger than the outer-layer twisting angle.

The force in an untwisting direction in the inner layer 11 tends to be smaller than the force in an untwisting direction in the outer layer 12 having a relatively large size in a circumferential direction. However, by making the inner-layer twisting angle larger than the outer-layer twisting angle, the difference between the force in an untwisting direction in the inner layer 11 and the force in an untwisting direction in the outer layer 12 can be reduced. Therefore, the force in an untwisting direction can be reduced as a whole.

The pair of tension members 4 is disposed so as to face each other with the core 3 interposed therebetween. For example, each of the tension members 4 is formed of a metal wire such as a steel wire or a tension fiber.

The pair of rip cords 5 is disposed so as to face each other with the core 3 interposed therebetween. As each of the rip cords 5, a fiber cord formed of a polyester fiber, an aramid fiber, a glass fiber, or the like can be used.

The sheath 6 covers an outer periphery of the core 3, the tension members 4, and the rip cords 5 collectively. As a material of the sheath 6, a resin such as polyethylene (PE) or polyvinyl chloride (PVC) can be used.

When an intermediate post branching operation is performed for the optical fiber cable 10, the sheath 6 is torn and stripped off by the rip cords 5. Subsequently, the units 2 of the core 3 are exposed, a portion of the optical fibers 1 is cut, and the cut optical fibers 1 are connected to a branch destination optical fiber.

Method of Manufacturing Optical Fiber Cable

Figure 4A:
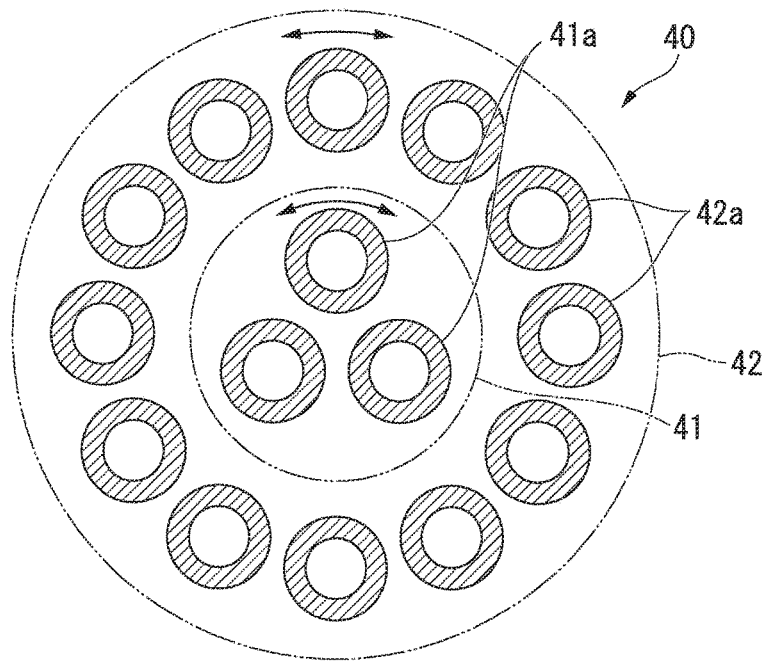
FIG. 4(A) is a schematic view showing a fiber distributing board of a manufacturing apparatus which can be used for manufacturing the optical fiber cable shown in FIG. 1.
Figure 4B:
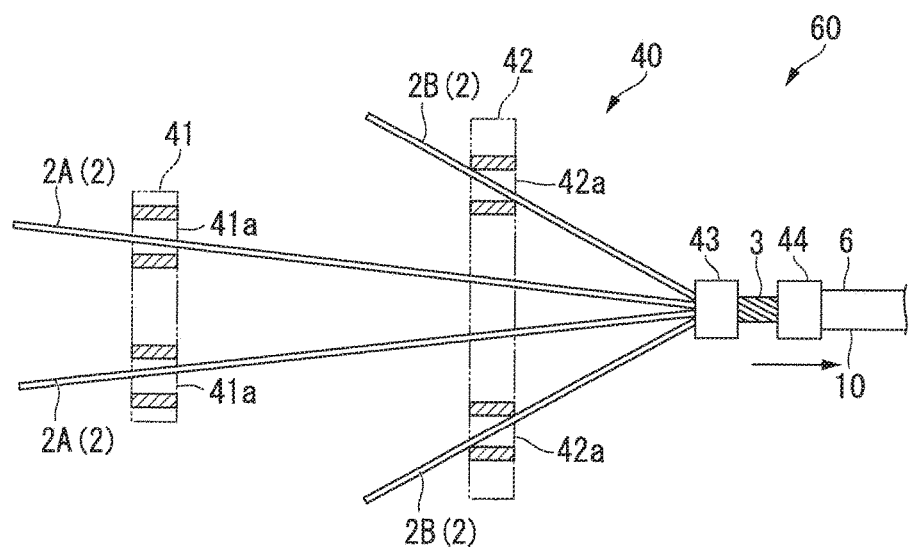
FIG. 4(B) is a diagram for describing a manufacturing method using the manufacturing apparatus shown in FIG. 4(A).

In order to manufacture the optical fiber cable 10, a manufacturing apparatus 60 shown in FIG. 4(B) can be used.

As shown in FIGS. 4(A) and 4(B), the manufacturing apparatus 60 includes a fiber distributing board 40, an assembling mechanism 43, and an extruder 44 (sheath forming apparatus).

The fiber distributing board 40 includes an inner layer fiber distributing portion 41 (first fiber distributing portion) and an outer layer fiber distributing portion 42 (second fiber distributing portion) having a larger diameter than the inner layer fiber distributing portion 41.

The inner layer fiber distributing portion 41 includes a plurality of inner layer unit insertion portions 41a (first unit insertion portions) into which the units 2 (inner layer units 2A) constituting the inner layer 11 are inserted. The outer layer fiber distributing portion 42 includes a plurality of outer layer unit insertion portions 42a (second unit insertion portions) into which the units 2 (outer layer units 2B) constituting the outer layer 12 are inserted.

As shown in FIG. 4(A), the inner layer unit insertion portions 41a are arranged along a circle in a planar view. The outer layer unit insertion portions 42a are concentric with a circle formed by the inner layer unit insertion portions 41a, and are arranged along a circle having a larger diameter than the circle formed by the inner layer unit insertion portions 41a.

Formation of Core 3

As shown in FIG. 4(B), in order to manufacture the optical fiber cable 10, one of the inner layer units 2A is inserted into one of the inner layer unit insertion portions 41a, one of the outer layer units 2B is inserted into one of the outer layer unit insertion portions 42a, and the inserted inner layer unit 2A and the inserted outer layer unit 2B are received.

At this time, the inner layer fiber distributing portion 41 and the outer layer fiber distributing portion 42 are rotated independently in a circumferential direction (cable shaft rotation direction) to twist the inner layer units 2A and the outer layer units 2B.

The inner layer fiber distributing portion 41 and the outer layer fiber distributing portion 42 are rotated such that the twisting directions of the units 2 (2A and 2B) are opposite to each other.

The core 3 is obtained by assembling the inner layer units 2A and the outer layer units 2B in the assembling mechanism 43.

Note that the cable shaft rotation direction is a shaft rotation direction of the optical fiber cable 10.

Formation of Sheath 6

By disposing the tension members 4 and the rip cords 5 in an outer periphery of the core 3 and covering the core 3, the tension members 4, and the rip cords 5 collectively with a resin material or the like using the extruder 44 (sheath forming apparatus), the sheath 6 is formed. The sheath 6 holds a twisted state of the inner layer units 2A and the outer layer units 2B.

The optical fiber cable 10 shown in FIG. 1 or the like is obtained by the above processes.

In the optical fiber cable 10, the twisting direction of the units 2 in the inner layer 11 is opposite to that in the outer layer 12. Therefore, a direction of a force of the units 2 in the inner layer 11 to remove twisting is opposite to a direction of a force of the units 2 in the outer layer 12 to remove twisting. Therefore, these forces are cancelled by each other in at least a portion, and a force in an untwisting direction is reduced as a whole.

Therefore, it is possible to prevent the optical fiber cable 10 from being deformed into a noncircular shape due to the force in an untwisting direction.

The present invention is not limited to the above embodiment, and can be modified appropriately in a range not departing from a gist of the present invention.

For example, in the optical fiber cable 10 shown in FIG. 1 or the like, the twisting direction of the units 2 in the inner layer 11 is opposite to that in the outer layer 12 in the entire range in the cable length direction. However, the twisting direction of the units 2 in the inner layer 11 may be opposite to that in the outer layer 12 not in the entire range but only in a portion in the cable length direction. For example, when the twisting pitch in the inner layer 11 is different from that in the outer layer 12 or when the position of the reversing portion R in the inner layer 11 is different from that in the outer layer 12, the twisting direction of the units 2 in the inner layer 11 is opposite to that in the outer layer 12 in a portion in the cable length direction. The range in which the twisting direction of the units 2 in the inner layer 11 is opposite to that in the outer layer 12 in the cable length direction is preferably more than 50% with respect to the total length.

In addition, in the optical fiber cable 10 shown in FIG. 1 or the like, the number of layers is two, but is not limited thereto, and may be any number of three or more. Even when the number of layers is three or more, as long as the twisting directions of the units in at least two layers among the layers are opposite to each other, the above effect can be obtained.

When the number of layers is three or more, the number of fiber distributing boards in the manufacturing apparatus is also preferably three or more. When the number of fiber distributing boards is the same as the number of layers, an effect for preventing deformation of the optical fiber cable 10 can be increased. The number of fiber distributing boards may be smaller than the number of layers. In this case, an apparatus configuration can be simplified.

Note that the inner layer 11 corresponds to a (n−1)th layer and the outer layer 12 corresponds to a (n)th layer in the above embodiment when the number of layers is n (n is an integer of two or more).

The positions of two layers having opposite twisting directions of the units to each other in a stacking direction are not particularly limited. In the optical fiber cable 10 shown in FIG. 1 or the like, the two layers 11 and 12 having opposite twisting directions to each other are adjacent to each other in the stacking direction. However, the positions are not limited thereto, and may be apart from each other in the stacking direction.

Even when the positions of two layers having opposite twisting directions to each other are different from those of the layers 11 and 12 in the optical fiber cable 10 shown in FIG. 1, as long as the twisting directions of the units in at least two layers are opposite to each other, the above effect can be obtained.

The twisting pitch of the units and the twisting angle thereof are not limited to the above preferable ranges, and can be modified appropriately according to design.

The number of units constituting each of the first layer and the second layer, or the number of optical fibers constituting each of the units is not particularly limited.

Figure 7:
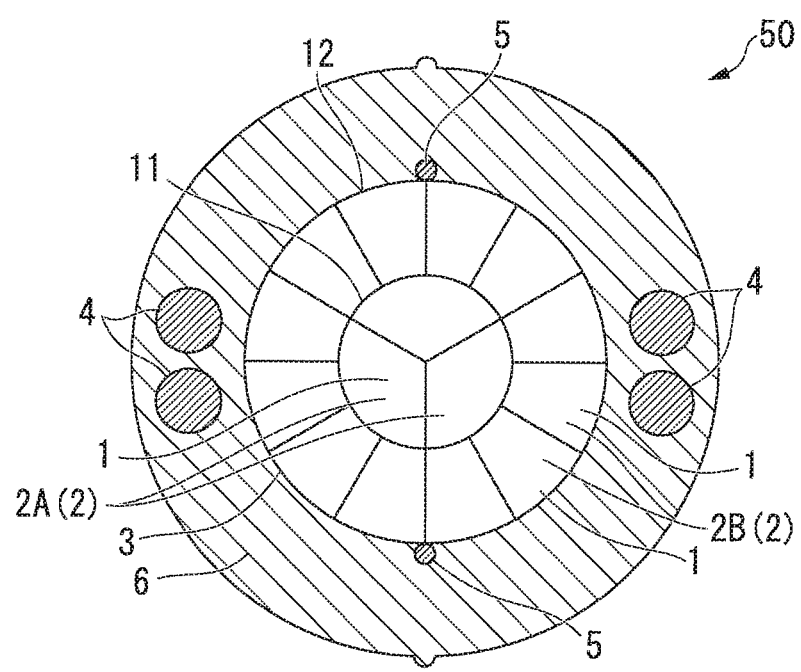
FIG. 7 is a cross-sectional view showing a modified example of the optical fiber cable according to the embodiment of the present invention.

The kind of the tension member, the outer diameter thereof, or the number thereof is not particularly limited, but application thereof is possible in a range which a person skilled in the art can generally conceive of. For example, not only a pair of tension members but also a plurality of pairs of tension members may be present. FIG. 7 shows an example of an optical fiber cable including a plurality of pairs of tension members. An optical fiber cable 50 shown here includes two pairs of the tension members 4 facing each other with the core 3 interposed therebetween. The number of tension members may be three pairs or more.

The kind of the sheath, the outer diameter thereof, or the inner diameter thereof is not particularly limited, but any configuration can be applied in a range which a person skilled in the art can generally conceive of.

In the optical fiber cable 10 shown in FIG. 1 or the like, each of the units 2 is an assembly of the optical fibers 1, but a unit may be constituted by a single optical fiber (optical fiber core wire or the like).

As shown in FIGS. 3(A) and 3(B), the twisting direction of the units 2 in the inner layer 11 is opposite to that in the outer layer 12. The twisting angle of the units 2 in the inner layer 11 is the same as that in the outer layer 12.

When the optical fiber cable 10 is manufactured, the units 2 in the inner layer 11 and the units 2 in the outer layer 12 were twisted independently using the manufacturing apparatus 60 shown in FIG. 4(B).

A maximum outer diameter of the optical fiber cable 10 and a minimum outer diameter thereof were measured. Table 1 and FIG. 5 show a result thereof.

Figure 5:
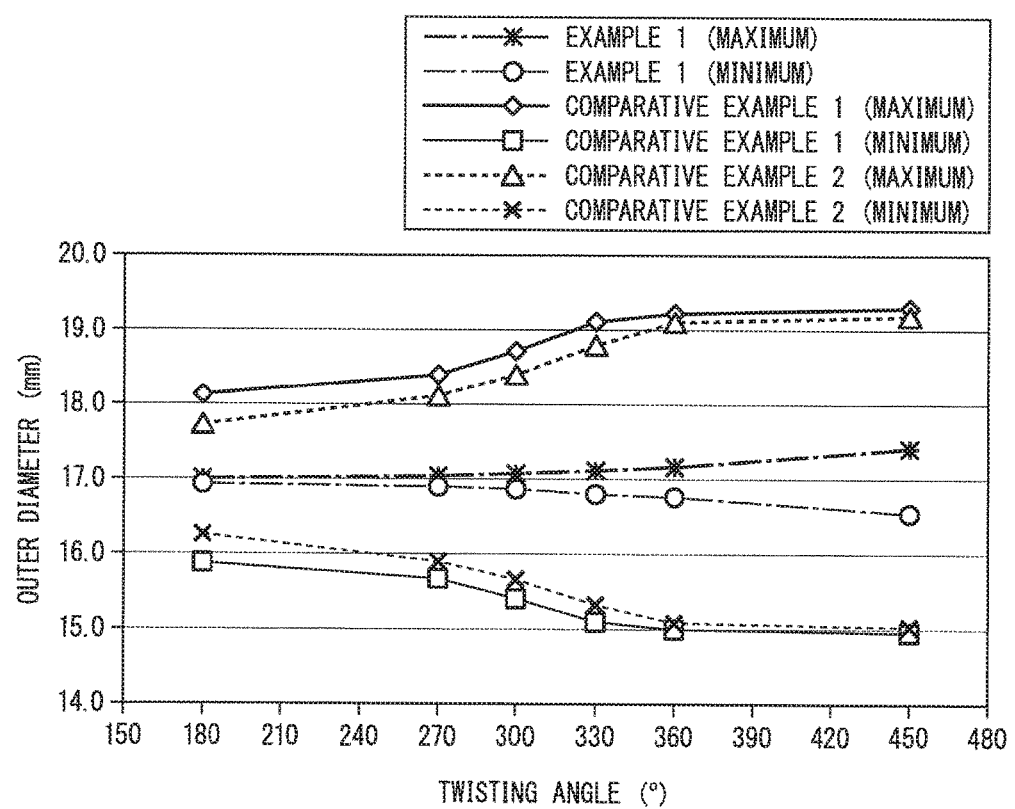
FIG. 5 is a diagram showing a test result.

As shown in Table 1 and FIG. 5, the difference between the maximum outer diameter and the minimum outer diameter is small, and therefore it is found that the cross-sectional shape has not become noncircular.

An outer diameter tolerance required for an optical fiber cable having an outer diameter of 17 mm is generally about 1 mm due to suitability or the like to a closure or the like, and a result satisfying the request has been obtained in the present Example.

TABLE 1

|  | Twisting method | Twisting pitch [mm] | Twisting angle [°] | Standard outer diameter [mm] | Maximum outer diameter [mm] | Minimum outer diameter [mm] |
|---|---|---|---|---|---|---|
| Example 1 | Inner layer and outer layer are twisted independently (opposite directions) | 800 | 180 | 17.0 | 17.0 | 17.0 |
|  |  |  | 270 | 17.0 | 17.1 | 16.9 |
|  |  |  | 300 | 17.0 | 17.1 | 16.9 |
|  |  |  | 330 | 17.0 | 17.2 | 16.8 |
|  |  |  | 360 | 17.0 | 17.2 | 16.8 |
|  |  |  | 450 | 17.0 | 17.4 | 16.6 |
| Comparative Example 1 | Inner layer and outer layer are twisted collectively (the same direction) | 800 | 180 | 17.0 | 18.2 | 15.9 |
|  |  |  | 270 | 17.0 | 18.4 | 15.7 |
|  |  |  | 300 | 17.0 | 18.7 | 15.4 |
|  |  |  | 330 | 17.0 | 19.1 | 15.1 |
|  |  |  | 360 | 17.0 | 19.2 | 15.0 |
|  |  |  | 450 | 17.0 | 19.3 | 15.0 |
| Comparative Example 2 | Inner layer and outer layer are twisted independently (the same direction) | 800 | 180 | 17.0 | 17.8 | 16.3 |
|  |  |  | 270 | 17.0 | 18.1 | 15.9 |
|  |  |  | 300 | 17.0 | 18.4 | 15.7 |
|  |  |  | 330 | 17.0 | 18.8 | 15.4 |
|  |  |  | 360 | 17.0 | 19.1 | 15.1 |
|  |  |  | 450 | 17.0 | 19.2 | 15.0 |

Note that holding of a twisted state of the inner layer units 2A and the outer layer units 2B may be assisted, for example, by winding a tape or a cord around the core 3 in the assembling mechanism 43 shown in FIG. 4(B).

EXAMPLES

Example 1

The optical fiber cable 10 shown in FIGS. 1 to 3 was manufactured.

The units 2 (2A and 2B) constituting the inner layer 11 and the outer layer 12 have an SZ-twisted shape.

The optical fiber cable 10 had a standard outer diameter of 17.0 mm. The number of the units 2 (inner layer units 2A) constituting the inner layer 1 was three. The number of the units 2 (outer layer units 2B) constituting the outer layer 12 was nine. The number of the optical fibers 1 constituting one of the units 2 was 72. The twisting pitch p was 800 mm.

Comparative Example 1

Figure 8:
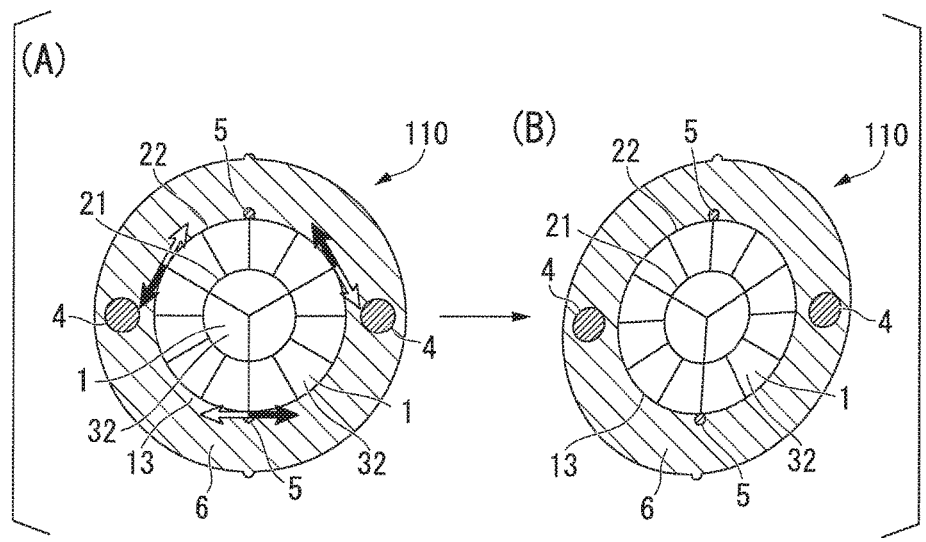
FIG. 8(A) is a cross-sectional view showing an example of the optical fiber cable.
FIG. 8(B) is a cross-sectional view showing a deformed state of the optical fiber cable shown in FIG. 8(A).
Figure 9:
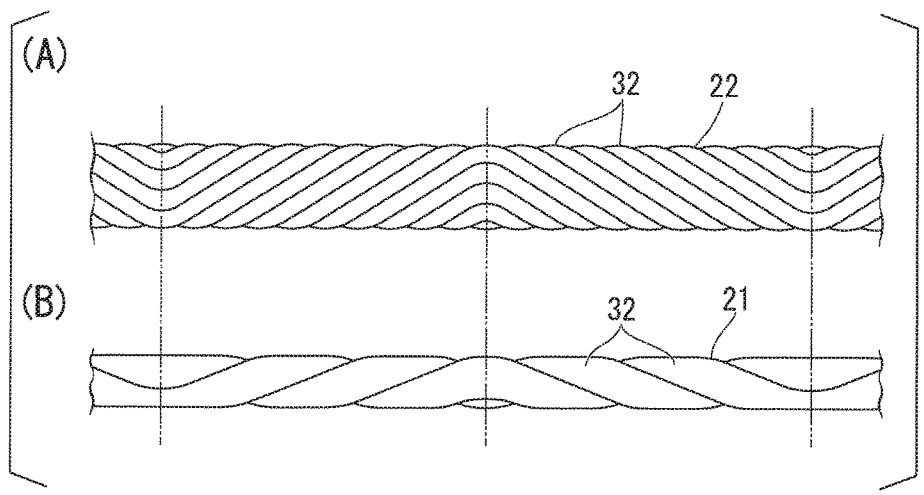
FIG. 9(A) is a side view showing an outer layer unit of the optical fiber cable shown in FIGS. 8(A) and 8(B).
FIG. 9(B) is a side view showing an inner layer unit of the optical fiber cable shown in FIG. 9(A).

As shown in FIGS. 8(A), 9(A), and 9(B), an optical fiber cable 110 in which a twisting direction of units 32 in the inner layer 21 was the same as that in the outer layer 22 was manufactured.

In the present Comparative Example, when the units 32 in the inner layer 21 and the outer layer 22 were twisted using the fiber distributing board, the units 32 in the inner layer 21 and the units 32 in the outer layer 22 were twisted collectively.

Other configurations were made according to Example 1.

Table 1 and FIG. 5 show a result of measurement of a maximum outer diameter of the optical fiber cable 110 and a minimum outer diameter thereof.

As shown in Table 1 and FIG. 5, the difference between the maximum outer diameter and the minimum outer diameter is larger than that in Example 1 in a range in which the twisting angle is large, and therefore it is found that the cross-sectional shape has become noncircular.

Comparative Example 2

As shown in FIGS. 8(A), 9(A), and 9(B), an optical fiber cable 110 in which a twisting direction of units 32 in the inner layer 21 was the same as that in the outer layer 22 was manufactured.

In the present Comparative Example, when the units 32 in the inner layer 21 and the outer layer 22 were twisted using the fiber distributing board, the units 32 in the inner layer 21 and the units 32 in the outer layer 22 were twisted independently.

Other configurations were made according to Example 1.

Table 1 and FIG. 5 show a result of measurement of a maximum outer diameter of the optical fiber cable 110 and a minimum outer diameter thereof.

As shown in Table 1 and FIG. 5, the difference between the maximum outer diameter and the minimum outer diameter is larger than that in Example 1 in a range in which the twisting angle is large, and therefore it is found that the cross-sectional shape has become noncircular.

Results in Example 1 and Comparative Examples 1 and 2 indicate that it has been possible to prevent the cross-sectional shape from becoming noncircular by making the twisting direction of the units 2 in the inner layer 11 opposite to that in the outer layer 12 in Example 1.

In addition, results in Comparative Examples 1 and 2 indicate the following. That is, as for becoming non-circular in the cross-sectional shape, even when the units in the inner layer and the units in the outer layer are twisted independently, as long as the twisting directions are the same as each other, there is no large difference from being twisted collectively.

Example 2

The optical fiber cable 10 shown in FIGS. 1 to 3 was manufactured.

The optical fiber cable 10 had a standard outer diameter of 17.0 mm similarly to Example 1. The twisting pitch p was 800 mm. Other configurations were made according to Example 1.

The twisting angle of the units 2 in the inner layer 11 and the twisting angle of the units 2 in the outer layer 12 are indicated in Table 2.

A maximum outer diameter of the optical fiber cable 10 and a minimum outer diameter thereof were measured. Table 2 and FIG. 6 show a result thereof.

TABLE 2

| Inner layer twisting angle [°] | Outer layer twisting angle [°] | Maximum outer diameter [mm] | Minimum outer diameter [mm] |
|---|---|---|---|
| 180 | 180 | 17.0 | 17.0 |
|  | 270 | 17.4 | 16.7 |
|  | 300 | 17.7 | 16.4 |
|  | 330 | 18.1 | 15.9 |
|  | 360 | 18.5 | 15.6 |
|  | 450 | 18.9 | 15.3 |
| 270 | 180 | 17.2 | 16.8 |
|  | 270 | 17.1 | 16.9 |
|  | 300 | 17.3 | 16.7 |
|  | 330 | 17.5 | 16.5 |
|  | 360 | 17.9 | 16.2 |
|  | 450 | 18.2 | 15.8 |
| 360 | 180 | 17.6 | 16.5 |
|  | 270 | 17.3 | 16.8 |
|  | 300 | 17.1 | 16.9 |
|  | 330 | 17.1 | 16.9 |
|  | 360 | 17.4 | 16.6 |
|  | 450 | 17.8 | 16.2 |
| 450 | 180 | 17.8 | 16.3 |
|  | 270 | 17.6 | 16.4 |
|  | 300 | 17.4 | 16.7 |
|  | 330 | 17.2 | 16.8 |
|  | 360 | 17.1 | 16.9 |
|  | 450 | 17.4 | 16.6 |

Figure 6:
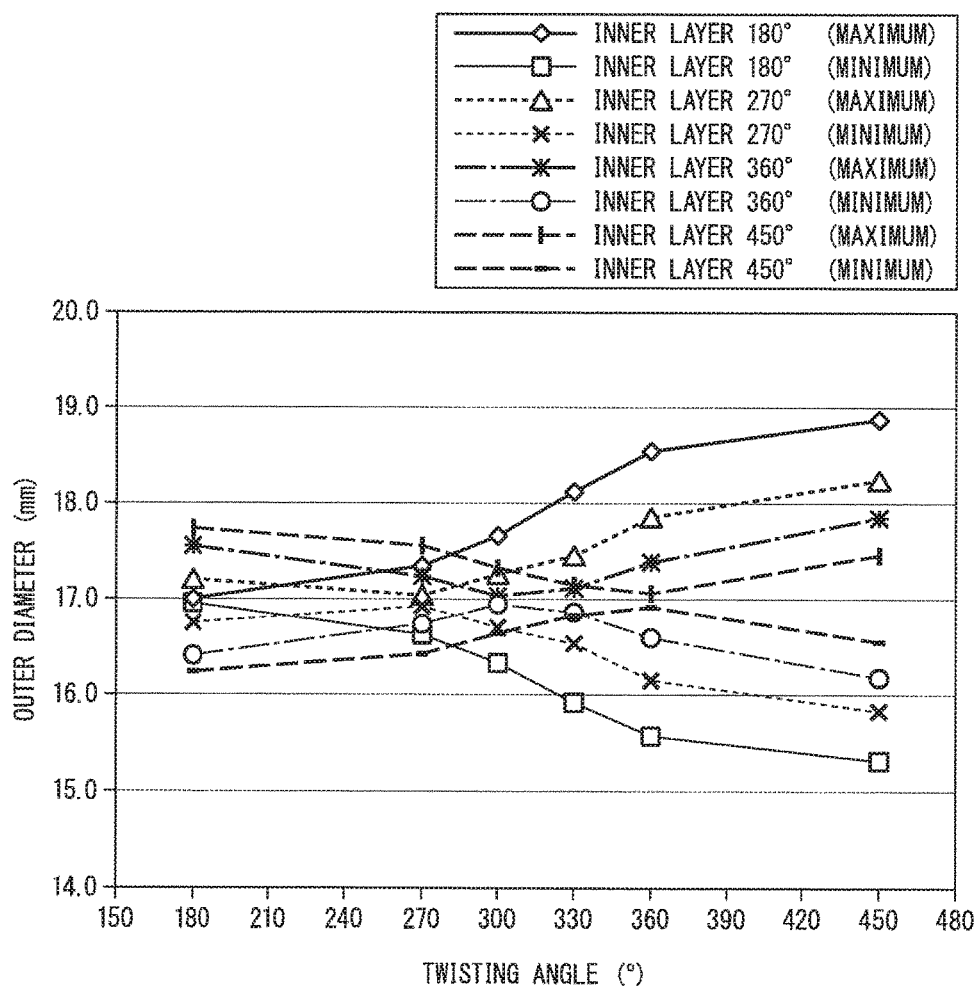
FIG. 6 is a diagram showing a test result.

Table 2 and FIG. 6 indicate that the cross-sectional shape hardly becomes noncircular when the twisting angle of the units 2 in the inner layer 11 (inner-layer twisting angle) and the twisting angle of the units 2 in the outer layer 12 (outer-layer twisting angle) satisfy the following Expression (1).

$$\text{Outer-layer twisting angle} - \text{Inner-layer twisting angle} \leq 120° \quad (1)$$

DESCRIPTION OF THE REFERENCE SYMBOLS

1: Optical fiber
2: Unit
3: Core
4: Tension member
6: Sheath
10: Optical fiber cable
11: Inner layer (first layer)
12: Outer layer (second layer)
40: Fiber distributing board
41: Inner layer fiber distributing portion (first fiber distributing portion)
41a: Inner layer unit insertion portion (first unit insertion portion)
42: Outer layer fiber distributing portion (second fiber distributing portion)
42a: Outer layer unit insertion portion (second unit insertion portion)
43: Assembling mechanism
44: Extruder (sheath forming apparatus)
R, R1, R2: Reversing portion
R11, R21: First reversing portion
R12, R22: Second reversing portion

What is claimed is:

1. An optical fiber cable comprising:
a core comprising a plurality of units which are assembled and are twisted so as to form a plurality of layers, each of which comprises a plurality of optical fibers which are assembled, and which comprises a plurality of first-layer units and a plurality of second-layer units;
a pair of tension members disposed so as to face each other with the core interposed therebetween; and
a sheath covering the core and the pair of tension members collectively, wherein:
the plurality of layers comprises a first layer comprising the first-layer units formed in an SZ-twisted shape and a second layer covering the first layer and comprising the second-layer units formed in an SZ-twisted shape;
the first layer is arranged at a center portion of the core; and a twisting direction of the first-layer units is opposite to a twisting direction of the second-layer units in at least a portion in a cable length direction.

2. The optical fiber cable according to claim 1, wherein a twisting angle of the first-layer units and a twisting angle of the second-layer units satisfy the following Expression (1):

Twisting angle of second-layer units−Twisting angle of first-layer units≤120°    (1).

3. The optical fiber cable according to claim 2, wherein the twisting angle of the first-layer units is larger than the twisting angle of the second-layer units.

4. The optical fiber cable according to claim 1, wherein each of the twisting angles of the first-layer units and the second-layer units is 180° or more.

5. A method of manufacturing the optical fiber cable according to claim 1 using a fiber distributing board comprising a plurality of fiber distributing portions, wherein:
the plurality of fiber distributing portions comprises a first fiber distributing portion comprising a first unit insertion portion into which the first-layer units are inserted and a second fiber distributing portion comprising a second unit insertion portion into which the second-layer units are inserted;
the first-layer units are inserted into the first unit insertion portion and the second-layer units are inserted into the second unit insertion portion;
while the first-layer units and the second-layer units are received, the first fiber distributing portion and the second fiber distributing portion are rotated independently in a cable shaft rotation direction to twist the first-layer units and the second-layer units;
during the rotation, the first fiber distributing portion and the second fiber distributing portion are rotated such that a twisting direction of the first-layer units is opposite to a twisting direction of the second-layer units to form the core; and
the sheath is formed so as to cover the core and the pair of tension members collectively.

6. An apparatus for manufacturing the optical fiber cable according to claim 1, comprising a fiber distributing board comprising a plurality of fiber distributing portions, an assembling mechanism which twists and assembles the first-layer units and the second-layer units, and a sheath forming apparatus which forms the sheath, wherein:
the plurality of fiber distributing portions comprise a first fiber distributing portion comprising a first unit insertion portion into which the first-layer units are inserted and a second fiber distributing portion comprising a second unit insertion portion into which the second-layer units are inserted; and
the first fiber distributing portion and the second fiber distributing portion can be rotated independently in a cable shaft rotation direction.

7. An optical fiber cable comprising:
a core comprising a plurality of units which are assembled and are twisted so as to form a plurality of layers, each of which comprises a plurality of optical fibers which are assembled, and which comprises a plurality of first-layer units and a plurality of second-layer units;
a pair of tension members disposed so as to face each other with the core interposed therebetween; and
a sheath covering the core and the pair of tension members collectively, wherein:
the pair of tension members is embedded in the sheath;
the plurality of layers comprises a first layer comprising the first-layer units formed in an SZ-twisted shape and a second layer covering the first layer and comprising the second-layer units formed in an SZ-twisted shape;
the first layer is arranged at a center portion of the core; and
a twisting direction of the first-layer units is opposite to a twisting direction of the second-layer units in at least a portion in a cable length direction.

* * * * *